Patented Mar. 8, 1949

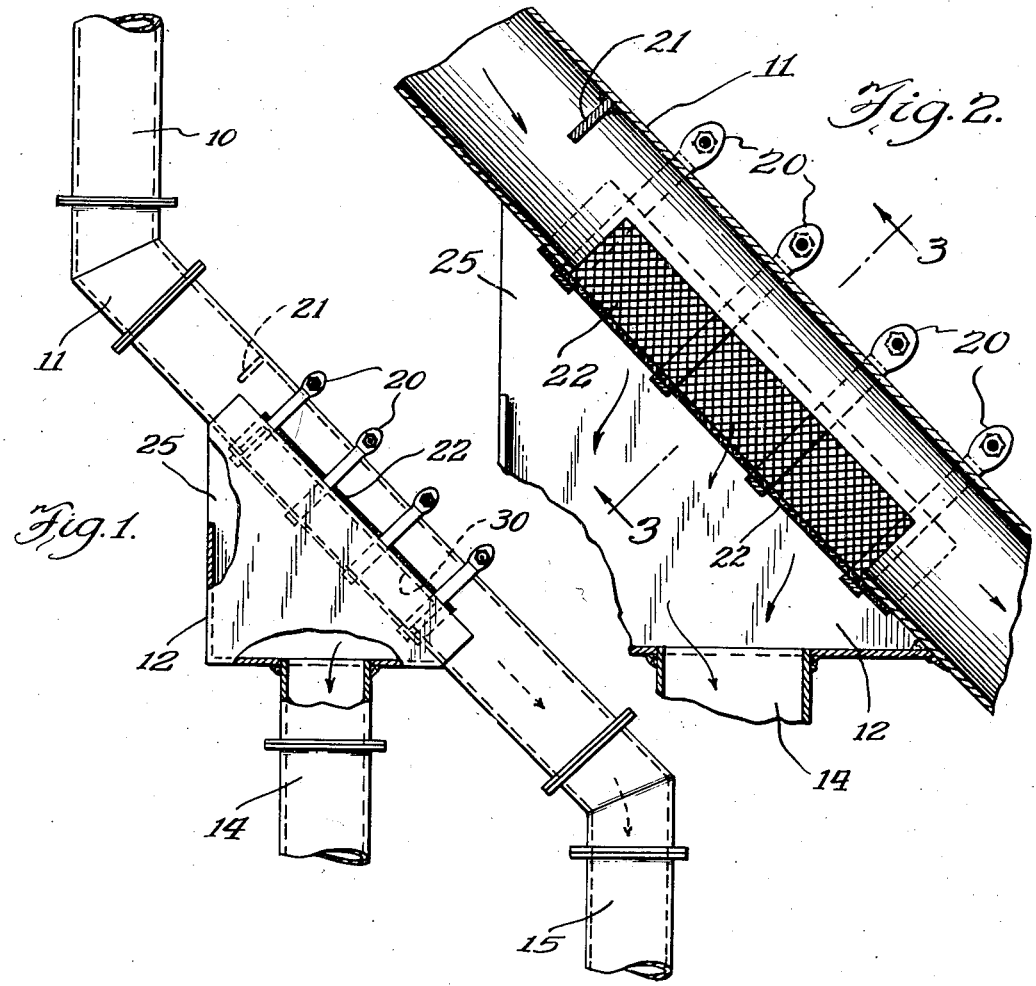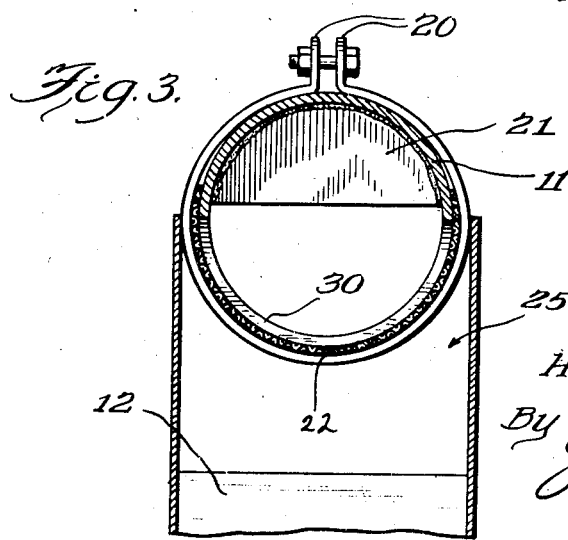

2,463,814

UNITED STATES PATENT OFFICE 2,463,814

DEWATERING APPARATUS

Harold A. Skinner, Wausau, Wis., assignor to Marathon Corporation, Rothschild, Wis., a corporation of Wisconsin Application November 7, 1944, Serial No. 562,343

4 Claims. (Cl. 92—29)

This invention relates to a dewatering apparatus. More specifically the invention relates to an apparatus for removing excessive water from very light consistency paper pulp stock or other solids suspended in fluids.

The present invention involves a very simple and inexpensive construction that is extremely efficient, easy to operate and can be readily installed. Further details and advantages of the invention will be apparent from the following specification and drawings wherein Figure 1 is a side elevational view of my apparatus, partly in section, Figure 2 is an enlarged fragmental longitudinal sectional view of the apparatus shown in Figure 1, and Figure 3 is a sectional view taken on lines 3—3 of Figure 2.

Referring to the drawings, paper pulp stock of very light consistency and high water content is fed through vertically positioned pipe 10. The pulp stock is fed by a suitable pump or by gravity flow. The size of pipe 10 is selected depending upon the quantity of material to be handled. A pipe section 11 is joined at its upper end to pipe 10 by a 45° elbow joint so that pipe 11 is inclined about 45° from the vertical. The lower end of pipe 11 is joined to a vertically positioned pipe 15. A portion of pipe 11 is cut away about 40% at its bottom circumference, as indicated by numeral 30, to provide a substantially rectangular opening and a wire mesh screen 22 of suitable dimensions is fastened on the pipe 11 so as to close the opening 30. The wire mesh screen 22 is retained in place by means of metal straps or bands 20. Only three or four spaced straps are used so that the wire mesh is loosely retained on pipe 11.

A metal baffle plate 21 is positioned at the upper top portion of pipe 11 to deflect and direct the flow of the materials toward the wire mesh screen. Surrounding the wire mesh screen 22 a suitable container 12 is fastened to catch and conduct the water or fluid which will pass through the wire mesh screen 22 from the inside of the pipe 11. This container 12 is preferably made of metal and is open at the front end 25 to allow air passage to the screen and for the purpose of cleaning it. The water or fluid collected in the container may be reused, or disposed of to the sewer through pipe 14.

The mesh of the wire screen 22 used will determine the efficiency of the fluid removal and obviously a finer mesh wire will remove less of the fluid and, of course any fine solid material. The capacity for water or fluid removal without wasting material is governed by the size of wire mesh, the size of screening surface, the pitch of the inclined pipe line, and pressure in the pipe line. The air passage to the screen and loosely retained wire mesh screen allows the screen surface to pulsate and consequently keeps it clean in operation. Only an occasional cleaning of the wire mesh screen with water, air or steam may be necessary without interfering with the dewatering operation.

The present apparatus requires no power to operate, does not have any moving parts, requires very little attention, and can easily be built, if necessary, of scrap material found in any mill. Its application in the pulp stock line increases production capacity and efficiency of the dewatering equipment now in use. The fiber loss is negligible if the proper wire mesh is used and it functions exceptionally well in removing the fines which are considered quite objectionable to most papermakers.

As an example of what can be expected by using this screen, one ton of paper pulp as it comes from the average screening operation contains about 100,000 gallons of water which must be removed partially or in its entirety in the subsequent operation. This is a very large quantity of water, and quite naturally the more water to be removed will require more or larger equipment and because of low density usage this equipment is not always as efficient as it should be. Any water that can be removed previous to the regular dewatering or washing process will certainly and surely increase both efficiency and production of any such regular equipment. The present equipment will remove at least 50% of the water when installed of proper size. In the case of large volume removal any number of screens may be installed to take care of proper removal. This apparatus is applicable for necessary fluid removal from any substance held in suspension and consequently may be used in many industries besides in the paper and pulp industry, for separating any types of solids suspended in fluids.

In operation, the inclined pipe 11 having the construction described is placed in the pulp stock line. As the pulp flows through the line, water or other fluid is removed through screen 22 without any substantial loss of the pulp or other solid materials that may be suspended in the water or other fluid. The wire mesh screen is self-cleaning because as the mixture of pulp and water flows through pipe 10 a slight pulsation occurs in the mixture to be dewatered due to entrapped air and gravity flow of the mass. As previously explained, the air passage 25 in conjunction with the loosely retained wire mesh screen 22 on pipe 11 permit the screen 22 to pulsate thereby keeping it clean and preventing clogging. The water or other fluid removed through screen 22 will flow into container 12 and then through a drain opening provided at the bottom through pipe 14 to the sewer. The dewatered stock will flow through the lower portion of pipe 11 into vertically positioned pipe 15.

It is to be understood that modifications and changes may be made in the specific equipment disclosed herein which are intended to be included within the scope of the appended claims.

I claim:

1. In a pulp stock line, a stationary, substantially vertically positioned pipe for feeding a light consistency paper pulp stock, a stationary inclined pipe positioned at an angle with respect to said vertically positioned pipe and connected thereto at the lower end thereof, a substantial portion of the lower circumference of said inclined pipe being cut away and covered with a screen, the edges of said screen being in contiguous, unattached relation with respect to the supporting area of said inclined pipe and means for loosely retaining said screen on said inclined pipe to cause pulsation of said screen.

2. In a pulp stock line, a stationary vertically positioned pipe for feeding a light consistency paper pulp stock, a stationary inclined pipe positioned at an angle with respect to said vertically positioned pipe and connected thereto at the lower end thereof a substantial portion of the lower circumference of said inclined pipe being cut away and covered with a screen, the edges of said screen being in contiguous, unattached relation with respect to the supporting area of said inclined pipe and loosely retained thereon by means of spaced straps surrounding said inclined pipe and screen to cause pulsation of the screen and a container enclosing said screen for conducting water passing through said screen.

3. In a pulp stock line, a stationary vertically positioned pipe for feeding a light consistency paper pulp stock, a stationary inclined pipe positioned at approximately 45° with respect to said vertically positioned pipe and connected thereto at the lower end thereof, the lower end of said inclined pipe being connected to a substantially, vertically positioned pipe for conveying the partially dewatered stock, a substantial portion of the lower circumference of said inclined pipe being cut away and covered with a screen, the edges of said screen being in contiguous, unattached relation with respect to the supporting area of said inclined pipe and loosely retained thereon by means of spaced straps surrounding said inclined pipe and screen to cause pulsation of said screen.

4. In a pulp stock line, a stationary vertically positioned pipe for feeding a light consistency paper pulp stock, a stationary inclined pipe positioned at approximately 45° with respect to said vertically positioned pipe and connected thereto at the lower end thereof, the lower end of said inclined pipe being connected to a substantially, vertically positioned pipe for conveying the partially dewatered stock, a substantial portion of the lower circumference of said inclined pipe being cut away and covered with a screen, the edges of said screen being in contiguous, unattached relation with respect to the supporting area of said inclined pipe and loosely retained thereon by means of spaced straps surrounding said inclined pipe and screen to cause pulsation of said screen and an air-vented container enclosing said screen for conducting water passing through said screen.

HAROLD A. SKINNER.

REFERENCES CITED

The following references are of record in the file of this patent:

UNITED STATES PATENTS

| Number | Name | Date |
|---|---|---|
| 326,945 | Burdge | Sept. 29, 1885 |
| 479,617 | Berthelet | July 26, 1892 |
| 905,374 | Sherwood | Dec. 1, 1908 |
| 964,897 | Bryant | July 19, 1910 |
| 1,236,072 | Ellis | Aug. 7, 1917 |
| 1,480,500 | Brown | Jan. 8, 1924 |
| 1,731,193 | Decker | Oct. 8, 1929 |
| 2,286,132 | Wolle | June 9, 1942 |

FOREIGN PATENTS

| Number | Country | Date |
|---|---|---|
| 149,842 | Germany | Mar. 25, 1904 |
| 569,662 | Germany | Feb. 6, 1933 |